(12) United States Patent
Weighell et al.

(10) Patent No.: US 8,570,714 B2
(45) Date of Patent: Oct. 29, 2013

(54) ELECTRICAL DISTRIBUTION PANEL

(76) Inventors: Christopher A. Weighell, Winnipeg (CA); Alan E. Grabinski, Winnipeg (CA)

( * ) Notice: Subject to any disclaimer, the term of this patent is extended or adjusted under 35 U.S.C. 154(b) by 393 days.

(21) Appl. No.: 13/090,611

(22) Filed: Apr. 20, 2011

(65) Prior Publication Data

US 2011/0261507 A1    Oct. 27, 2011

Related U.S. Application Data

(60) Provisional application No. 61/326,415, filed on Apr. 21, 2010.

(51) Int. Cl.
*H02B 7/00* (2006.01)

(52) U.S. Cl.
USPC ........... 361/621; 361/611; 361/624; 361/637; 361/648; 200/50.32; 174/50

(58) Field of Classification Search
USPC ......... 361/605, 611, 614, 621, 622, 624, 627, 361/631, 632–644, 648, 652, 656, 673
See application file for complete search history.

(56) References Cited

U.S. PATENT DOCUMENTS

| | | | |
|---|---|---|---|
| 3,743,891 A | 7/1973 | Buxton | |
| 5,574,612 A | 11/1996 | Pak | |
| 5,675,194 A * | 10/1997 | Domigan | 307/147 |
| 5,751,524 A * | 5/1998 | Swindler | 361/42 |
| 5,761,027 A * | 6/1998 | Flegel | 361/664 |
| 5,784,249 A * | 7/1998 | Pouliot | 361/622 |
| 6,621,689 B1 * | 9/2003 | Flegel | 361/631 |
| 7,542,268 B2 * | 6/2009 | Johnson, Jr. | 361/622 |
| 7,616,432 B2 * | 11/2009 | Luebke et al. | 361/631 |
| 8,341,837 B2 * | 1/2013 | Braunstein et al. | 29/854 |
| 2009/0244817 A1 * | 10/2009 | Moyer | 361/634 |
| 2011/0235244 A1 * | 9/2011 | Mills et al. | 361/656 |

* cited by examiner

*Primary Examiner* — Courtney Smith
(74) *Attorney, Agent, or Firm* — Ryan W. Dupuis; Kyle R. Satterthwcu; Ade & Company Inc.

(57) ABSTRACT

An electrical distribution panel includes a panel box locating a ground bus in electrical connection with a ground input lug, a neutral bus in electrical connection with a neutral input lug, and a primary power bus connected to a power input lug through a main breaker switch. The main breaker switch is operable between an on position in which the primary power bus receives power and an off position in which the primary power bus is disconnected. Primary circuit breakers can be supported in the usual manner in connection with the primary power bus. One or more auxiliary circuit breakers are connected to the power input lug to receive power independently of the main breaker switch. An electrical outlet can thus be integrally supported in one of the side walls of the panel box to receive power independently of the main breaker switch.

14 Claims, 2 Drawing Sheets

__ELECTRICAL DISTRIBUTION PANEL__

This application claims the benefit under 35 U.S.C. 119(e) of U.S. provisional application Ser. No. 61/326,415, filed Apr. 21, 2010.

FIELD OF THE INVENTION

The present invention relates to an electrical distribution panel comprising a plurality of circuit breakers and a main breaker coupled between a main electrical supply and the plurality of primary circuit breakers, and more particularly the present invention relates to an electrical distribution panel further comprising an auxiliary circuit breaker supplying power to an electrical outlet integrally supported in the box of the distribution panel wherein the auxiliary circuit breaker is coupled to the main electrical supply independently of the main breaker and the primary circuit breakers.

BACKGROUND

In many instances, it is desirable to have power available in proximity to an electrical distribution panel box. U.S. Pat. No. 3,743,891 by Buxton, U.S. Pat. No. 5,574,612 by Pak, and U.S. Pat. No. 5,784,249 by Pouliot disclosed various examples of electrical distributions panels incorporating electrical outlets therein. In each instance however, the electrical outlets are supplied with power after the main shut off breaker of the panel so that no power is provided to the outlets when the main shut off breaker is in the off position as required to perform electrical work on the panel box.

It is also desirable to keep some circuits in a building with constant and uninterrupted power even when the main shut off breaker of the panel is in the off position for performing work on the panel box. Examples of circuits where it is desirable to maintain a constant supply of power include service outlets adjacent the panel box, furnace circuits, alarm circuits and the like.

US Patent Application Publication No. 2009/0244817 by Moyer discloses an electrical distribution system in which a primary distribution panel and a secondary distribution panel are provided separately from one another. The majority of the circuits in a building are connected to the secondary panel while more essential circuits are connected to the primary panel such that the secondary circuits can be commonly disconnected with a single control even when the primary circuits remain active. All of the primary circuit breakers are shut off when a main breaker switch of the primary panel is turned off when performing work on the primary panel along with power to the secondary panel as the second panel derives power from the primary panel as in a typical installation configuration of a main panel and subpanel. No continuous power electrical outlet is provided on either of the primary or secondary distribution panels when a main shut off breaker at the inlet of the primary panel is in the off position. The configuration of the primary and secondary distribution panels separate from one another is particularly time consuming and expensive to install due to the two part installation process.

SUMMARY OF THE INVENTION

According to one aspect of the invention there is provided an electrical distribution panel for connection to an electrical supply comprising a power line, a ground line and a neutral line, the panel comprising:

a panel box;

a ground input lug supported in the panel box and arranged for connection to the ground line of the electrical supply;

a ground bus supported in the panel box in electrical connection with the ground input lug;

a neutral input lug supported in the panel box and arranged for connection to the neutral line of the electrical supply;

a neutral bus supported in the panel box in electrical connection with the neutral input lug;

a power input lug supported in the panel box and arranged for connection to the power line of the electrical supply;

a primary power bus supported in the panel box;

a main breaker switch supported on the panel box so as to be in series between the power input lug and the primary power bus, the main breaker switch being operable between an on position in which the primary power bus is in electrical communication with the power input lug and an off position in which the primary power bus and the power input lug are disconnected from one another;

a plurality of primary circuit breakers supported on the panel box in connection with the primary power bus such that the primary circuit breakers are each arranged to only receive power from the primary power bus when the main breaker switch is in the on position;

at least one auxiliary circuit breaker connected to the power input lug such that said at least one auxiliary circuit breaker is arranged to receive power from the power input lug independently of the position of the main breaker switch.

By providing a single primary panel box which is readily equipped to provide power to the auxiliary circuit breakers ahead of the electrical connection to the main breaker switch and the primary circuit breakers, a user can run electrical equipment off of the outlet integrally supported on the panel box even when the main breaker switch is in the off position for performing work on the primary circuit breakers.

There may be a plurality of auxiliary circuit breakers connected to respective electrical loads which are remote from the panel box.

Preferably one of the auxiliary circuit breakers is electrically connected to an electrical outlet integrally supported on the panel box.

The electrical outlet may comprise a ground-fault circuit interrupter.

When the panel box comprises a rear wall at a rear of the panel box, side walls projecting forwardly from a periphery of the rear wall, a front opening at a front of the panel box through which an interior of the panel box is accessible, and a cover arranged to span the front opening at the front of the panel box, preferably the electrical outlet is integrally supported in one of the side walls of the panel box.

The electrical outlet may be supported above the main breaker switch when the auxiliary circuit breakers are supported adjacent a top end of the panel box, the plurality of primary circuit breakers are supported adjacent a bottom end of the panel box, and the main breaker switch is supported at an intermediate location of the panel box between the auxiliary circuit breakers and the plurality of primary circuit breakers.

When there is a plurality of auxiliary circuit breakers, there may be provided an auxiliary power bus supported in the panel box in electrical connection with the power input lug so as to receive power from the power input lug independently of the position of the main breaker switch in which each one of the plurality of auxiliary circuit breakers is in electrical connection with the auxiliary power bus.

In some instances there may be provided an auxiliary breaker switch in connection between the power input lug and the auxiliary power bus in which the auxiliary breaker switch is operable between an on position in which the auxiliary power bus is in electrical communication with the power input lug and an off position in which the auxiliary power bus and the power input lug are disconnected from one another.

The auxiliary circuit breakers, the primary circuit breakers, and the main breaker switch are preferably commonly supported on a common rear wall of the panel box.

The cover of the panel box may comprise a lower panel portion having apertures through which the primary circuit breakers are accessible and an upper panel portion commonly locating therein a main aperture through which the main breaker switch is accessible and an auxiliary aperture through which said at least one auxiliary circuit breaker is accessible.

According to a second aspect of the present invention there is provided an electrical distribution panel for connection to an electrical supply comprising a power line, a ground line and a neutral line, the panel comprising:

a panel box comprising a rear wall at a rear of the panel box, side walls projecting forwardly from a periphery of the rear wall, a front opening at a front of the panel box through which an interior of the panel box is accessible, and a cover arranged to span the front opening at the front of the panel box;

a ground input lug supported in the panel box and arranged for connection to the ground line of the electrical supply; a ground bus supported in the panel box in electrical connection with the ground input lug;

a neutral input lug supported in the panel box and arranged for connection to the neutral line of the electrical supply;

a neutral bus supported in the panel box in electrical connection with the neutral input lug;

a power input lug supported in the panel box and arranged for connection to the power line of the electrical supply;

a primary power bus supported in the panel box;

a main breaker switch supported on the panel box so as to be in series between the power input lug and the primary power bus, the main breaker switch being operable between an on position in which the primary power bus is in electrical communication with the power input lug and an off position in which the primary power bus and the power input lug are disconnected from one another;

a plurality of primary circuit breakers supported on the panel box in connection with the primary power bus such that the primary circuit breakers are each arranged to only receive power from the primary power bus when the main breaker switch is in the on position;

at least one auxiliary circuit breaker connected to the power input lug such that said at least one auxiliary circuit breaker is arranged to receive power from the power input lug independently of the position of the main breaker switch; and an electrical outlet integrally supported in one of the side walls of the panel box;

the electrical outlet being electrically connected to said at least one auxiliary circuit breaker.

According to a further aspect of the present invention there is provided an electrical distribution panel for connection to an electrical supply comprising a power line, a ground line and a neutral line, the panel comprising:

a panel box comprising a rear wall at a rear of the panel box, side walls projecting forwardly from a periphery of the rear wall, a front opening at a front of the panel box through which an interior of the panel box is accessible, and a cover arranged to span the front opening at the front of the panel box;

a ground input lug supported in the panel box and arranged for connection to the ground line of the electrical supply;

a ground bus supported in the panel box in electrical connection with the ground input lug;

a neutral input lug supported in the panel box and arranged for connection to the neutral line of the electrical supply;

a neutral bus supported in the panel box in electrical connection with the neutral input lug;

a power input lug supported in the panel box and arranged for connection to the power line of the electrical supply;

a primary power bus supported in the panel box;

a main breaker switch supported on the panel box so as to be in series between the power input lug and the primary power bus, the main breaker switch being operable between an on position in which the primary power bus is in electrical communication with the power input lug and an off position in which the primary power bus and the power input lug are disconnected from one another;

a plurality of primary circuit breakers supported on the panel box in connection with the primary power bus such that the primary circuit breakers are each arranged to only receive power from the primary power bus when the main breaker switch is in the on position;

at least one auxiliary circuit breaker connected to the power input lug such that said at least one auxiliary circuit breaker is arranged to receive power from the power input lug independently of the position of the main breaker switch;

said at least one auxiliary circuit breaker, said plurality of primary circuit breakers, and the main breaker switch being commonly supported on a rear wall of the panel box;

said at least one auxiliary circuit breaker being supported adjacent a top end of the panel box;

the plurality of primary circuit breakers being supported adjacent a bottom end of the panel box; and the main breaker switch being supported at an intermediate location of the panel box between said at least one auxiliary circuit breaker and the plurality of primary circuit breakers.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
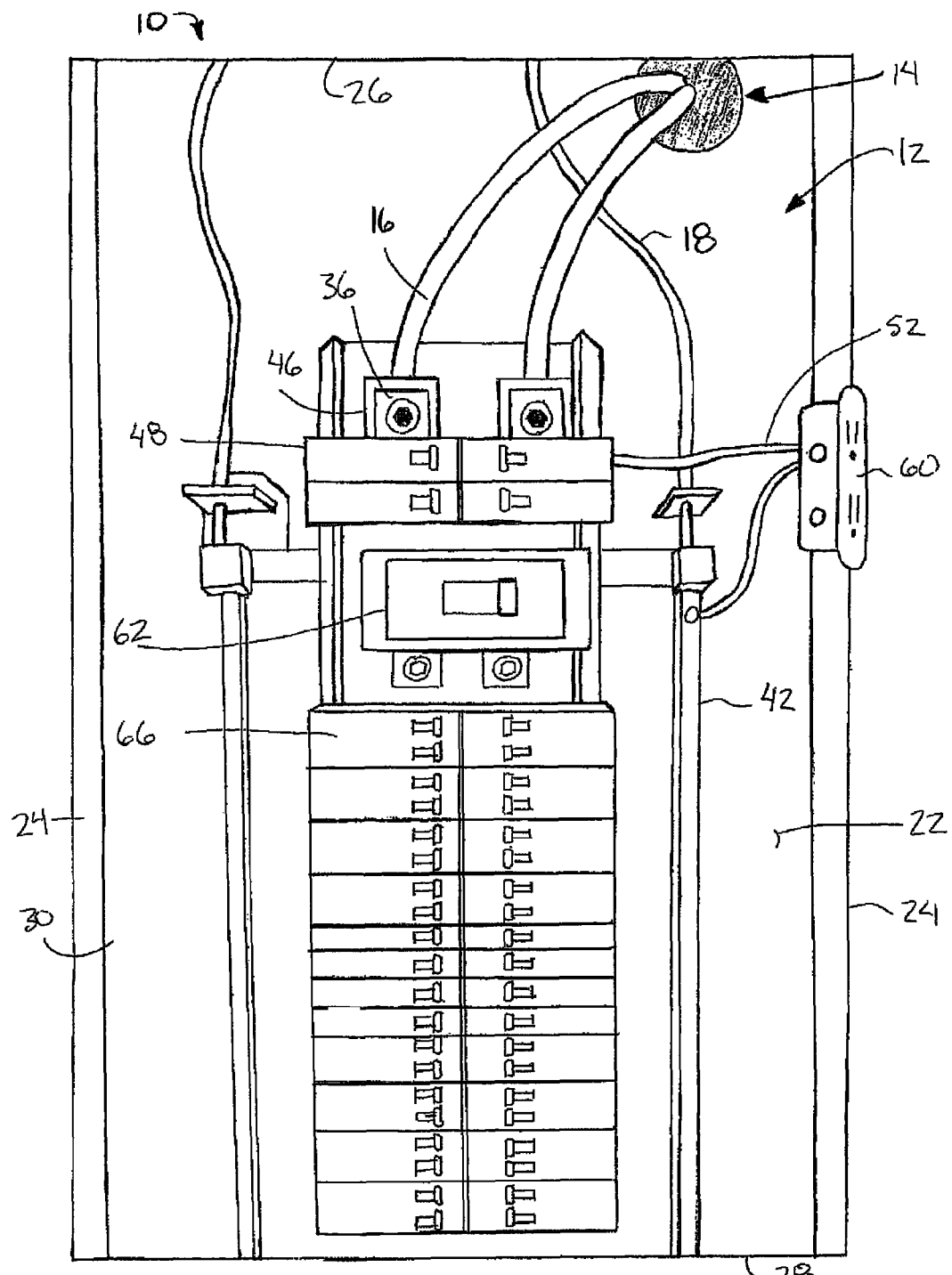
FIG. 1 is a perspective view of an electrical distribution panel according to the present invention.
Figure 2:
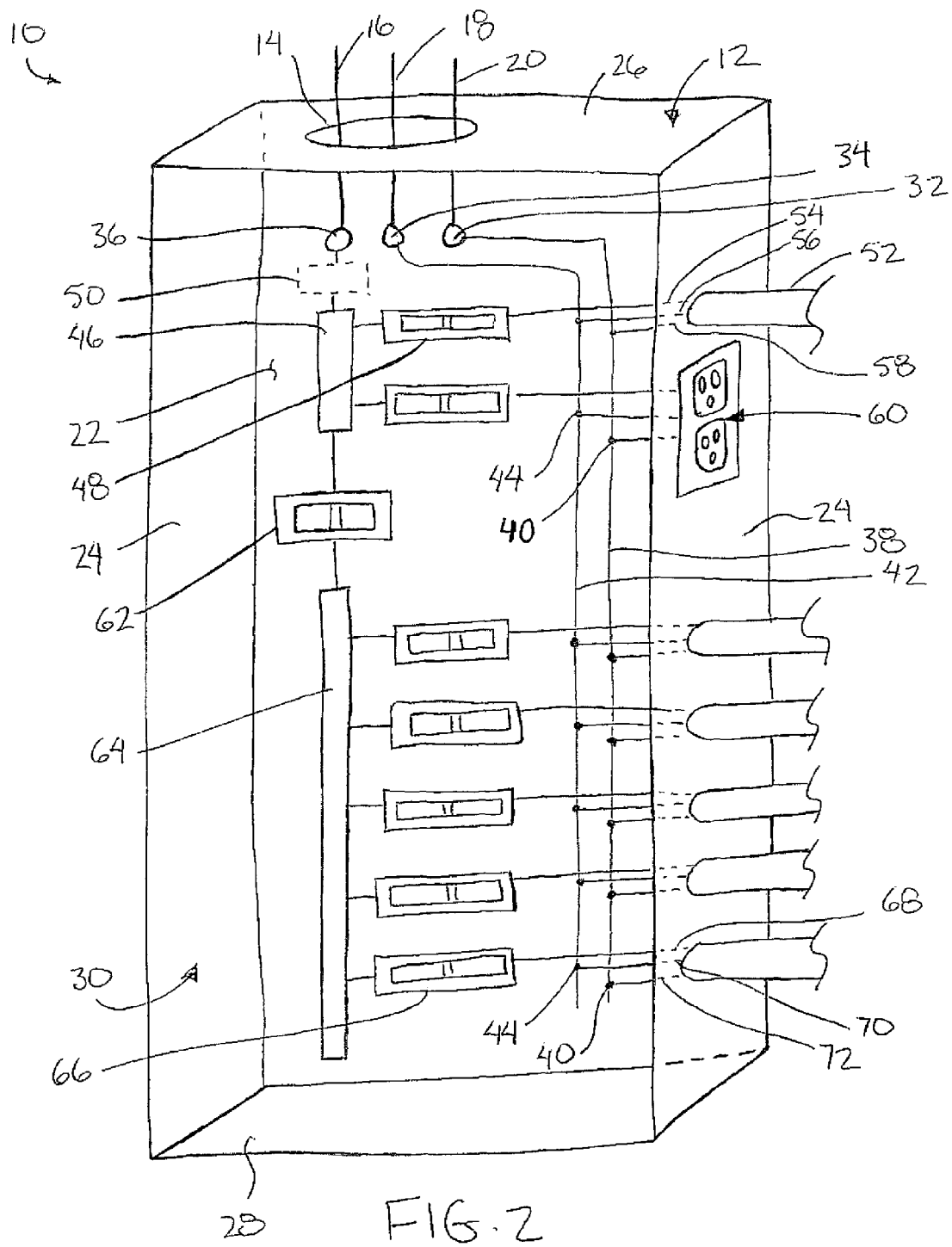
FIG. 2 is a schematic representation of the electrical connections in the electrical distribution panel of FIG. 1.

Referring to the accompanying figures, there is illustrated an electrical distribution panel generally indicated by reference numeral 10. The panel 10 typically comprises a panel box 12 receiving an electrical supply connection 14 which includes a power line 16, a neutral line 18, and a ground line 20.

The panel box 12 is elongate in an upright longitudinal direction and comprises a single integral rear wall 22 which supports two side walls 24 extending along opposing longitudinally extending sides of the rear wall. The two side walls 24 are perpendicular to the rear wall and project forwardly from the rear wall at the rear side of the panel box to the front side thereof. The panel box further comprises a top wall 26 joined between the two side walls along top edge of the rear wall and a bottom wall 28 extending between the two side walls 24 along the bottom edge of the rear wall. Together the two side walls, the top wall and the bottom wall extend forwardly from the rear wall about the full periphery or perimeter edge thereof. The walls terminate in a substantially common plane at the front side of the panel box to define a front opening 30 therebetween which spans between the walls and provides access therethrough to the hollow interior of the panel box.

A top end of the panel box typically locates within the hollow interior a ground input lug 32, a neutral input lug 34, and a power input lug 36. Each of the lugs is in electrical connection with a respective one of the lines of the electrical supply connection 14.

The ground input lug 32 connected to the ground line 20 is also connected to a ground bus 38 comprising one or more vertical bars mounted within the interior of the panel box. The ground bus includes a plurality of wire connectors 40 at spaced positions therealong in which each wire connector is arranged for fixed connection to a ground line of a respective circuit connected to the panel box.

The neutral input lug 34 is similarly connected to a neutral bus 42 in addition to connection to the neutral line 18. The neutral bus 42 also comprises one or more vertically oriented bars mounted within the panel box with a plurality of wire connectors 44 at spaced positions therealong for connection to respective neutral lines of a plurality of circuits connected to the panel box.

The power input lug 36 is arranged for connection to an auxiliary power bus 46 in the form of a vertically oriented bar mounted adjacent the top end of the panel box. The auxiliary power bus 46 also includes a plurality of connection points along the length thereof to which a plurality of auxiliary circuit breakers 48 are arranged to be connected. Power from the input lug 36 is thus supplied to the auxiliary circuit breakers 48 through the auxiliary power bus 46.

Optionally, an auxiliary breaker switch 50 may be provided in connection between the power input lug 36 and the auxiliary power bus 46 in which the switch is operable between on and off positions. In the on position the auxiliary power bus is in electrical communication with the power input lug. In the off position the auxiliary power bus and power input lug are disconnected with one another such that no power is provided to the auxiliary circuit breakers. The auxiliary breaker switch 50 is also provided adjacent the top end of the power box.

An auxiliary circuit 52 is connected to each one of the auxiliary circuit breakers such that a power line 54 of the circuit is connected to the respective auxiliary circuit breaker, a neutral line 56 of the circuit is connected to the neutral bus, and a ground line 58 of the circuit is connected to the ground bus.

At least one of the auxiliary circuit breakers is directly connected to an integral electrical outlet 60 integrally supported in one of the side walls 24 of the panel box adjacent the top end thereof. The electrical outlet includes a power line connected to the respective auxiliary circuit breaker, a neutral line connected to the neutral bus and a ground line connected to the ground bus. Typically the electrical outlet comprises a ground fault circuit interrupter. The outlet typically comprises two sets of female sockets arranged for mating connection to a conventional electrical plug in.

Typically the remaining auxiliary circuit breakers are connected to respective auxiliary circuits 52 which supply power to respective external loads remote from the panel box, for example furnace circuits, alarm circuits and the like.

Power from the auxiliary power bus is connected also to a main breaker switch 62 therebelow at an intermediate location on the panel box. Typically the integral electrical outlet 60 is supported at a location above the main breaker switch 62.

The main breaker switch 62 is connected in series between the auxiliary power bus and a primary power bus 64 also supported in the panel box adjacent the bottom end of the box.

More particularly the primary power bus 64 comprises one or more vertical bars extending between the intermediate location of the main breaker switch 62 and the bottom end of the panel box. The primary power bus 64 includes a plurality of connection points for connection to respective ones of a plurality of primary circuit breakers 66.

In the illustrated embodiment, the primary power bus 64 receives power from the power input lug through the auxiliary power bus, however in other embodiments, the primary power bus 64 may be directly connected to the power input lug. In either instance, the auxiliary power bus is arranged to receive power from the power input lug independently of the position of the main breaker switch 62 and/or the condition of primary power bus 64.

Each of the primary circuit breakers 66 is associated with a respective primary circuit. Each primary circuit includes a power line 68 connected to the respective primary circuit breaker, a ground line 70 connected to the ground bus and a neutral line 72 connected to the neutral bus.

The main breaker switch 62 is operable between an on and an off position. In the on position the primary power bus is in electrical communication with the power input lug through the auxiliary power bus such that all of the primary circuit breakers receive electrical power. In an off position the primary power bus and the power input lug are disconnected from one another such that no power is received to the primary power bus or the primary circuit breakers connected thereto.

All of the primary and auxiliary circuit breakers together with the main and auxiliary breaker switches in the illustrated embodiment are commonly supported on the rear wall of a single integral panel box. Typically, the main breaker switch is located at an intermediate location with the auxiliary circuit breakers positioned thereabove and the primary circuit breakers positioned therebelow.

Typically a cover is provided for spanning the front opening. The cover may include an upper portion and a lower portion in which the lower portion includes a plurality of primary breaker apertures therein for alignment with respective ones of the primary circuit breakers so that the switches of the primary circuit breakers are accessible through the apertures. Typically the upper portion comprises a common panel locating a main aperture therein through which the main breaker switch is accessible as well as a plurality of auxiliary apertures arranged to be formed therein for accessing respective ones of the auxiliary circuit breakers.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An electrical distribution panel for connection to an electrical supply comprising a power line, a ground line and a neutral line, the panel comprising:
   a panel box;
   a ground input lug supported in the panel box and arranged for connection to the ground line of the electrical supply;
   a ground bus supported in the panel box in electrical connection with the ground input lug;
   a neutral input lug supported in the panel box and arranged for connection to the neutral line of the electrical supply;
   a neutral bus supported in the panel box in electrical connection with the neutral input lug;

a power input lug supported in the panel box and arranged for connection to the power line of the electrical supply;

a primary power bus supported in the panel box;

a main breaker switch supported on the panel box so as to be in series between the power input lug and the primary power bus, the main breaker switch being operable between an on position in which the primary power bus is in electrical communication with the power input lug and an off position in which the primary power bus and the power input lug are disconnected from one another;

a plurality of primary circuit breakers supported on the panel box in connection with the primary power bus such that the primary circuit breakers are each arranged to only receive power from the primary power bus when the main breaker switch is in the on position;

at least one auxiliary circuit breaker connected to the power input lug such that said at least one auxiliary circuit breaker is arranged to receive power from the power input lug independently of the position of the main breaker switch.

2. The panel according to claim 1 wherein there is provided an electrical outlet integrally supported on the panel box, the electrical outlet being electrically connected to said at least one auxiliary circuit breaker.

3. The panel according to claim 2 wherein the panel box comprises a rear wall at a rear of the panel box, side walls projecting forwardly from a periphery of the rear wall, a front opening at a front of the panel box through which an interior of the panel box is accessible, and a cover arranged to span the front opening at the front of the panel box, and wherein the electrical outlet is integrally supported in one of the side walls of the panel box.

4. The panel according to claim 3 wherein the electrical outlet is supported above the main breaker switch.

5. The panel according to claim 2 wherein the electrical outlet comprises a ground-fault circuit interrupter.

6. The panel according to claim 1 in combination with an electrical load positioned remotely from the panel box, wherein said at least one auxiliary circuit breaker is in electrical communication with said electrical load.

7. The panel according to claim 1 wherein said at least one auxiliary circuit breaker comprises a plurality of auxiliary circuit breakers.

8. The panel according to claim 7 wherein there is provided an auxiliary power bus supported in the panel box in electrical connection with the power input lug so as to receive power from the power input lug independently of the position of the main breaker switch, each one of the plurality of auxiliary circuit breakers being in electrical connection with the auxiliary power bus.

9. The panel according to claim 8 wherein there is provided an auxiliary breaker switch in connection between the power input lug and the auxiliary power bus, the auxiliary breaker switch being operable between an on position in which the auxiliary power bus is in electrical communication with the power input lug and an off position in which the auxiliary power bus and the power input lug are disconnected from one another.

10. The panel according to claim 1 wherein said at least one auxiliary circuit breaker, said plurality of primary circuit breakers, and the main breaker switch are commonly supported on a rear wall of the panel box.

11. The panel according to claim 1 wherein said at least one auxiliary circuit breaker is supported adjacent a top end of the panel box, the plurality of primary circuit breakers are supported adjacent a bottom end of the panel box, and the main breaker switch is supported at an intermediate location of the panel box between said at least one auxiliary circuit breaker and the plurality of primary circuit breakers.

12. The panel according to claim 1 wherein the panel box comprises a rear wall at a rear of the panel box, side walls projecting forwardly from a periphery of the rear wall, a front opening at a front of the panel box through which an interior of the panel box is accessible, and a cover arranged to span the front opening at the front of the panel box, and wherein the cover comprises an upper panel portion commonly locating a main aperture through which the main breaker switch is accessible and an auxiliary aperture through which said at least one auxiliary circuit breaker is accessible and a lower portion locating a plurality of primary apertures therein through which respective ones of the primary circuit breakers are accessible.

13. An electrical distribution panel for connection to an electrical supply comprising a power line, a ground line and a neutral line, the panel comprising:

a panel box comprising a rear wall at a rear of the panel box, side walls projecting forwardly from a periphery of the rear wall, a front opening at a front of the panel box through which an interior of the panel box is accessible, and a cover arranged to span the front opening at the front of the panel box;

a ground input lug supported in the panel box and arranged for connection to the ground line of the electrical supply;

a ground bus supported in the panel box in electrical connection with the ground input lug;

a neutral input lug supported in the panel box and arranged for connection to the neutral line of the electrical supply;

a neutral bus supported in the panel box in electrical connection with the neutral input lug;

a power input lug supported in the panel box and arranged for connection to the power line of the electrical supply;

a primary power bus supported in the panel box;

a main breaker switch supported on the panel box so as to be in series between the power input lug and the primary power bus, the main breaker switch being operable between an on position in which the primary power bus is in electrical communication with the power input lug and an off position in which the primary power bus and the power input lug are disconnected from one another;

a plurality of primary circuit breakers supported on the panel box in connection with the primary power bus such that the primary circuit breakers are each arranged to only receive power from the primary power bus when the main breaker switch is in the on position;

at least one auxiliary circuit breaker connected to the power input lug such that said at least one auxiliary circuit breaker is arranged to receive power from the power input lug independently of the position of the main breaker switch; and an electrical outlet integrally supported in one of the side walls of the panel box;

the electrical outlet being electrically connected to said at least one auxiliary circuit breaker.

14. An electrical distribution panel for connection to an electrical supply comprising a power line, a ground line and a neutral line, the panel comprising:

a panel box comprising a rear wall at a rear of the panel box, side walls projecting forwardly from a periphery of the rear wall, a front opening at a front of the panel box through which an interior of the panel box is accessible, and a cover arranged to span the front opening at the front of the panel box;

a ground input lug supported in the panel box and arranged for connection to the ground line of the electrical supply;

a ground bus supported in the panel box in electrical connection with the ground input lug;

a neutral input lug supported in the panel box and arranged for connection to the neutral line of the electrical supply;

a neutral bus supported in the panel box in electrical connection with the neutral input lug;

a power input lug supported in the panel box and arranged for connection to the power line of the electrical supply;

a primary power bus supported in the panel box;

a main breaker switch supported on the panel box so as to be in series between the power input lug and the primary power bus, the main breaker switch being operable between an on position in which the primary power bus is in electrical communication with the power input lug and an off position in which the primary power bus and the power input lug are disconnected from one another;

a plurality of primary circuit breakers supported on the panel box in connection with the primary power bus such that the primary circuit breakers are each arranged to only receive power from the primary power bus when the main breaker switch is in the on position;

at least one auxiliary circuit breaker connected to the power input lug such that said at least one auxiliary circuit breaker is arranged to receive power from the power input lug independently of the position of the main breaker switch;

said at least one auxiliary circuit breaker, said plurality of primary circuit breakers, and the main breaker switch being commonly supported on a rear wall of the panel box;

said at least one auxiliary circuit breaker being supported adjacent a top end of the panel box;

the plurality of primary circuit breakers being supported adjacent a bottom end of the panel box; and the main breaker switch being supported at an intermediate location of the panel box between said at least one auxiliary circuit breaker and the plurality of primary circuit breakers.

* * * * *